United States Patent  
Hilldore

(10) Patent No.: US 10,412,312 B2
(45) Date of Patent: Sep. 10, 2019

(54) SYSTEM AND METHOD FOR PROCESSING VIDEO DATA TO DETECT AND ELIMINATE FLICKERING LIGHT SOURCES THROUGH DYNAMIC EXPOSURE CONTROL

(71) Applicant: Gentex Corporation, Zeeland, MI (US)

(72) Inventor: Benjamin B. Hilldore, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 15/670,471

(22) Filed: Aug. 7, 2017

(65) Prior Publication Data

US 2018/0041684 A1  Feb. 8, 2018

Related U.S. Application Data

(60) Provisional application No. 62/372,022, filed on Aug. 8, 2016.

(51) Int. Cl.
*B60R 1/00* (2006.01)
*H04N 5/235* (2006.01)

(52) U.S. Cl.
CPC ............. *H04N 5/2357* (2013.01); *B60R 1/00* (2013.01); *H04N 5/2353* (2013.01);
(Continued)

(58) Field of Classification Search
CPC .. H04N 5/2357; H04N 5/2356; H04N 5/2353; B60R 1/00; B60R 2300/30; G06T 2207/30248
(Continued)

(56) References Cited

U.S. PATENT DOCUMENTS 6,587,573 B1  7/2003  Stam et al.
6,593,698 B2  7/2003  Stam et al.
(Continued)

FOREIGN PATENT DOCUMENTS

EP    2391117 A2   11/2011
JP  2009214795 A   9/2009
(Continued)

OTHER PUBLICATIONS

International Search Report and Written Opinion of the International Searching Authority, dated Nov. 9, 2017, for International Application No. PCT/US2017/045731 filed Aug. 7, 2016, 6 pages.

*Primary Examiner* — Lin Ye
*Assistant Examiner* — Chan T Nguyen
(74) *Attorney, Agent, or Firm* — Price Heneveld LLP; Bradley D. Johnson

(57) ABSTRACT

An image capture system is provided for a vehicle equipped with a display for displaying streamed video images of a scene proximate the vehicle. The image capture system includes a camera for capturing video images of the scene proximate the vehicle at a selected exposure time and streaming the video images, and an image processing unit for receiving the streamed video images, processing the streamed video images and supplying the streamed video images to the display. The image processing unit is configured to detect amplitude-modulated light sources in the streamed video images, and adjust the exposure time of the camera to match a multiple of a modulation frequency of the amplitude-modulated light sources decreasing a flicker intensity of the amplitude-modulated light sources in the streamed video images supplied to the display.

16 Claims, 10 Drawing Sheets

(52) U.S. Cl.
CPC ........ *H04N 5/2356* (2013.01); *B60R 2300/30* (2013.01); *G06T 2207/30248* (2013.01)

(58) Field of Classification Search
USPC ...................................................... 348/226.1
See application file for complete search history.

(56) References Cited

U.S. PATENT DOCUMENTS

| | | | |
|---|---|---|---|
| 6,611,610 B1 | 8/2003 | Stam et al. | |
| 6,631,316 B2 | 10/2003 | Stam et al. | |
| 6,653,614 B2 | 11/2003 | Stam et al. | |
| 6,728,393 B2 | 4/2004 | Stam et al. | |
| 6,774,988 B2 | 8/2004 | Stam et al. | |
| 6,861,809 B2 | 3/2005 | Stam | |
| 6,906,467 B2 | 6/2005 | Stam et al. | |
| 6,947,577 B2 | 9/2005 | Stam et al. | |
| 7,321,112 B2 | 1/2008 | Stam et al. | |
| 7,417,221 B2 | 8/2008 | Creswick et al. | |
| 7,565,006 B2 | 7/2009 | Stam et al. | |
| 7,567,291 B2 | 7/2009 | Bechtel et al. | |
| 7,653,215 B2 | 1/2010 | Stam | |
| 7,683,326 B2 | 3/2010 | Stam et al. | |
| 7,881,839 B2 | 2/2011 | Stam et al. | |
| 8,045,760 B2 | 10/2011 | Stam et al. | |
| 8,120,652 B2 | 2/2012 | Bechtel et al. | |
| 8,543,254 B1 | 9/2013 | Schut et al. | |
| 9,511,715 B2 | 12/2016 | VanderPloeg | |
| 2004/0105027 A1 | 6/2004 | Kawamura et al. | |
| 2006/0054783 A1 | 3/2006 | Voronov et al. | |
| 2013/0176445 A1* | 7/2013 | Streeter | G01S 17/36 348/208.1 |
| 2014/0086590 A1* | 3/2014 | Ganick | G06Q 30/02 398/118 |
| 2015/0266427 A1 | 9/2015 | VanderPloeg et al. | |
| 2015/0277203 A1 | 10/2015 | VanderPloeg et al. | |
| 2016/0142607 A1 | 5/2016 | Lee | |
| 2016/0344916 A1* | 11/2016 | Murao | H04N 5/2351 |

FOREIGN PATENT DOCUMENTS

| | | |
|---|---|---|
| WO | 2011106578 A2 | 9/2011 |
| WO | 2015098325 A1 | 3/2017 |

* cited by examiner

SYSTEM AND METHOD FOR PROCESSING VIDEO DATA TO DETECT AND ELIMINATE FLICKERING LIGHT SOURCES THROUGH DYNAMIC EXPOSURE CONTROL

CROSS-REFERENCE TO RELATED APPLICATION

This application claims priority to and the benefit under 35 U.S.C. § 119(e) of U.S. Provisional Patent Application No. 62/372,022, filed on Aug. 8, 2016, entitled "SYSTEM AND METHOD FOR PROCESSING VIDEO DATA TO DETECT AND ELIMINATE FLICKERING LIGHT SOURCES THROUGH DYNAMIC EXPOSURE CONTROL," the entire disclosure of which is hereby incorporated herein by reference.

BACKGROUND

The present invention generally relates to processing of video images streamed to a display, and more specifically to processing of streamed video images of scenes exterior to a vehicle. In some embodiments the present invention pertains even more specifically to processing of video images obtained from a rearward facing camera in a vehicle that are streamed to a display serving as a replacement for a rearview mirror.

SUMMARY

According to one aspect of the disclosure, an image capture system for a vehicle is disclosed. The image capture system comprises a camera comprising a field of view for capturing video images of the scene proximate the vehicle and streaming the video images. The image capture system further comprises an image processing unit for receiving the streamed video images, processing the streamed video images, and supplying the streamed video images to the display. The image processing unit is configured to select a first exposure time based on ambient light conditions in the field of view and adjust the first exposure time to at least a second exposure time based on an amplitude-modulated light source in the streamed video images. The image processing unit is further configured to display the amplitude-modulated light source in the streamed video images supplied to the display with a reduced flicker intensity of the amplitude-modulated light sources.

According to another aspect of the disclosure, an image system is provided for a vehicle. The image system comprising: a camera for capturing video images of a scene proximate the vehicle at a selected exposure time and streaming the video images; an image processing unit for receiving the streamed video images and processing the streamed video images; and a display for displaying the streamed video images. Wherein to perform processing of the streamed video images, said image processing unit is configured to: detect amplitude-modulated light sources in the streamed video images, and adjust the exposure time of the camera to match a multiple of a modulation frequency of the amplitude-modulated light sources decreasing a flicker intensity of the amplitude-modulated light sources in the streamed video images supplied to the display.

According to yet another aspect of the disclosure, a method is provided of capturing video images streamed from a camera within a vehicle. The method comprising: detecting amplitude-modulated light sources in the streamed video images; and adjusting an exposure time of the camera to match a multiple of a modulation frequency of the amplitude-modulated light sources such that the amplitude-modulated light sources do not appear to flicker in the streamed video images when displayed.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 10A:
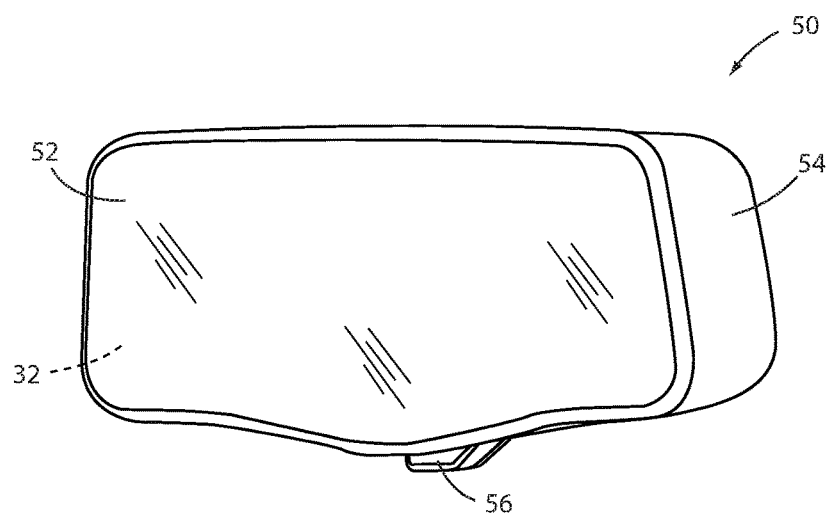
FIG. 10A is a front and side perspective view of a rearview assembly in which various components of an imaging system may be implemented.

For purposes of description herein the terms "upper," "lower," "right," "left," "rear," "front," "vertical," "horizontal," and derivatives thereof shall relate to the device as oriented in FIG. 10A. However, it is to be understood that the devices discussed herein may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

A problem associated with rendering streaming video data captured by an imager may occur when the object being imaged contains an amplitude-modulated (AM) light source. An example of an AM light source is one which is pulsing on/off at some periodic rate, like a vehicle lamp assembly constructed with light emitting diodes (LEDs), where the LEDs are pulse-width-modulated (PWM). The PWM period and duty cycle in such lamp assemblies may result in the LEDs being turned on and off at some periodic rate. Due to the periodic activation (e.g. on/off periods) a camera taking streaming images or video of such a lamp assembly may capture successive images where the LEDs may be 'on' in one or more consecutive images, and then 'off' in one or more subsequent images.

For many of the exemplary AM light sources listed above, a human directly observing the AM light source could not perceive any flicker in the 'on/off' pattern, since the frequency of the on/off pattern is higher than the human vision system can perceive (PWM LED headlamp/tail-lamp assemblies being a prime example). However, when recording an AM light source with an electronic camera system, the exposure time, frame rate, and shutter scheme (e.g. rolling or global) used when capturing the AM light source may result in one or more pixels of an imager array accumulating light when the AM light source is inactive. Such an unsynchronized capture of image data representing the AM light source may result in some images showing a pixel representing the AM light source to be in an 'on' state and successive images showing the pixel to be in an 'off' state. In these conditions, the AM light source may be consistently active but modulated at a frequency that creates a flickering effect in the image data. Accordingly, when displaying the image data at some display frame rate, the display system may present a human observer an 'on/off' pattern that is discernible as a 'flickering' light.

Figure 1:
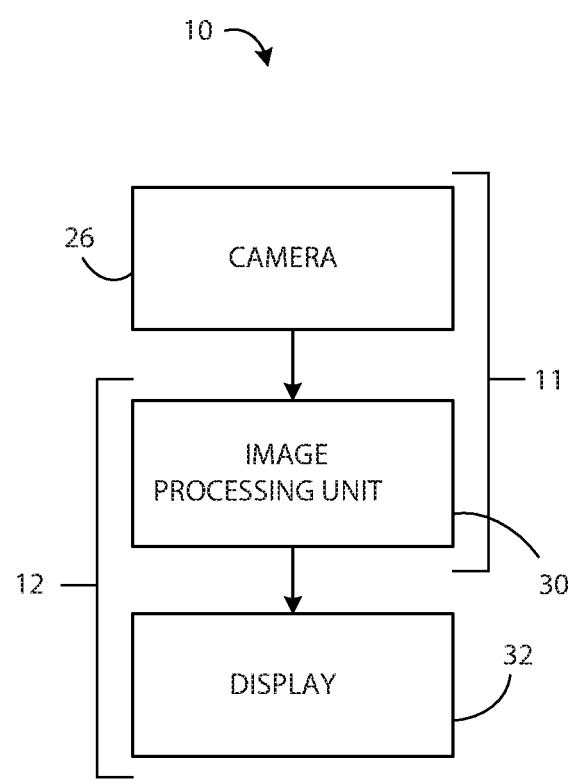
FIG. 1 is a block diagram of an imaging system according to an embodiment of the invention.

FIG. 1 shows an image system 10 according to a first embodiment. As shown, the image system 10 includes an image capture system 11, which includes a camera 26 that captures images of a scene and outputs streamed video images of the scene. The image system 10 further includes a display system 12, which includes a display 32 that displays the streamed video images. The image system 10 also includes an image processing unit 30 that receives the streamed video images from the camera 26 and processes the images (as discussed in detail below), adjusts the exposure time of the camera 26, and supplies the streamed video images to the display 32. The image processing unit 30 may be considered as part of the image capture system 11, the display system 12, or both.

The methods and processing sequences described herein are intended to mitigate the 'flickering' phenomena seen in rendered images of AM headlamps and tail-lamps (especially targeted to PWM LED assemblies, but not limited to lighting of that technology). As described below, the platform on which these methods may be implemented is part of an automotive mirror replacement system, where a vehicle mirror is replaced by a camera (lens plus digital imager) 26, image processing unit (serial processor and/or ASIC/FPGA) 30, and electronic display (LCD/LED panel) 32. The methods described herein may be incorporated in the image processing unit 30 in the above system 10.

Figure 2:
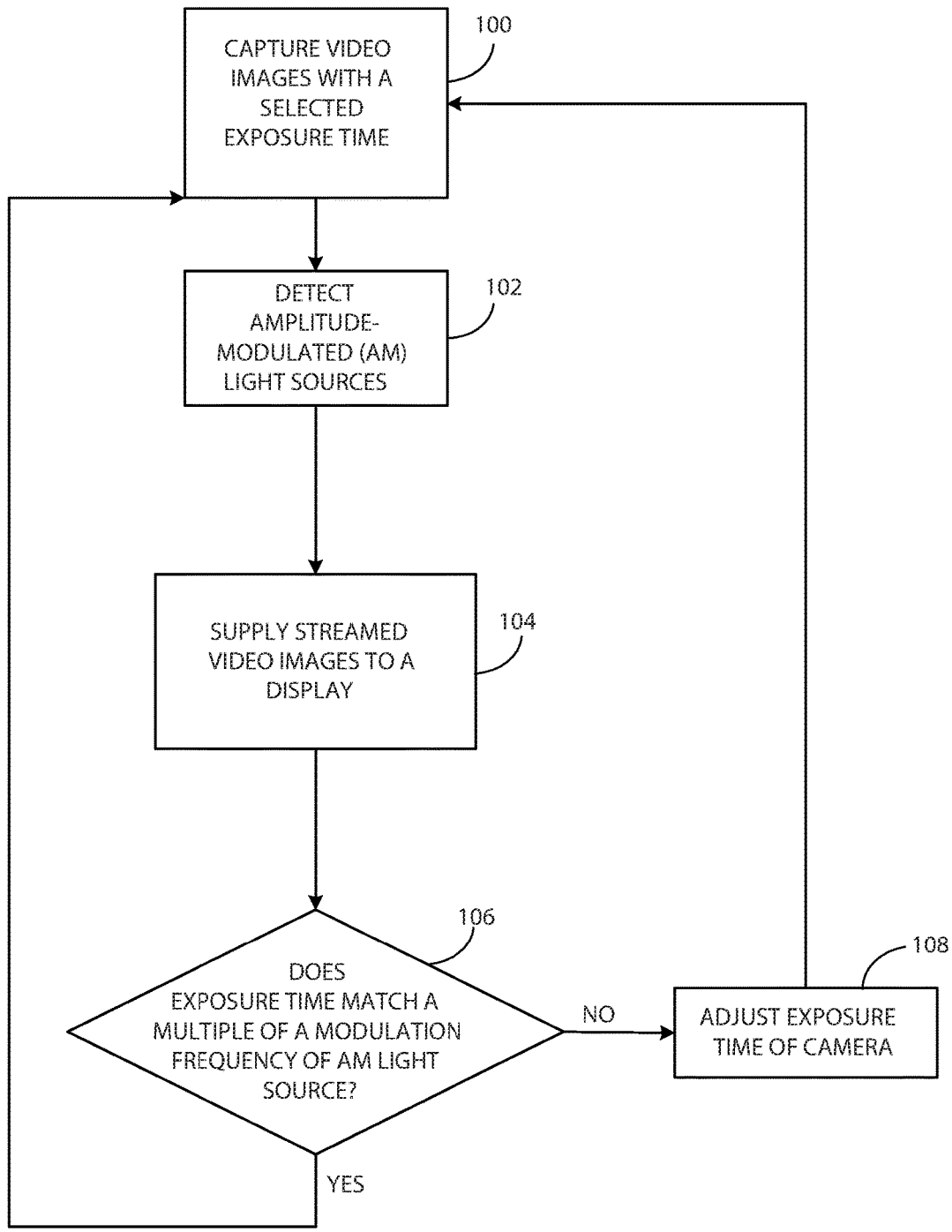
FIG. 2 is a flow chart showing the method steps performed by an image processing unit shown in FIG. 1.

As shown in FIG. 2, the image processing unit 30 may be operable to perform a method for capturing image data such that the flickering effect of an AM light source may be mitigated. The method may comprise the image processing unit 30 1) capturing video images with a selected exposure time (step 100); 2) detecting AM light sources in a succession of the captured images (step 102); 3) supplying the streamed video images to the display 32 (step 104); 4) determining if the exposure time matches a multiple of a modulation frequency of an AM light source (step 106); 4) if the exposure time does not match a multiple of a modulation frequency of an AM light source, adjusting the exposure time of the camera 26 (step 108) and then repeating steps 100-106; and 5) once the exposure time matches a multiple of a modulation frequency of an AM light source, the method may also continue to repeat steps 100-106. Possible techniques for each of these steps are detailed below.

Figure 3:
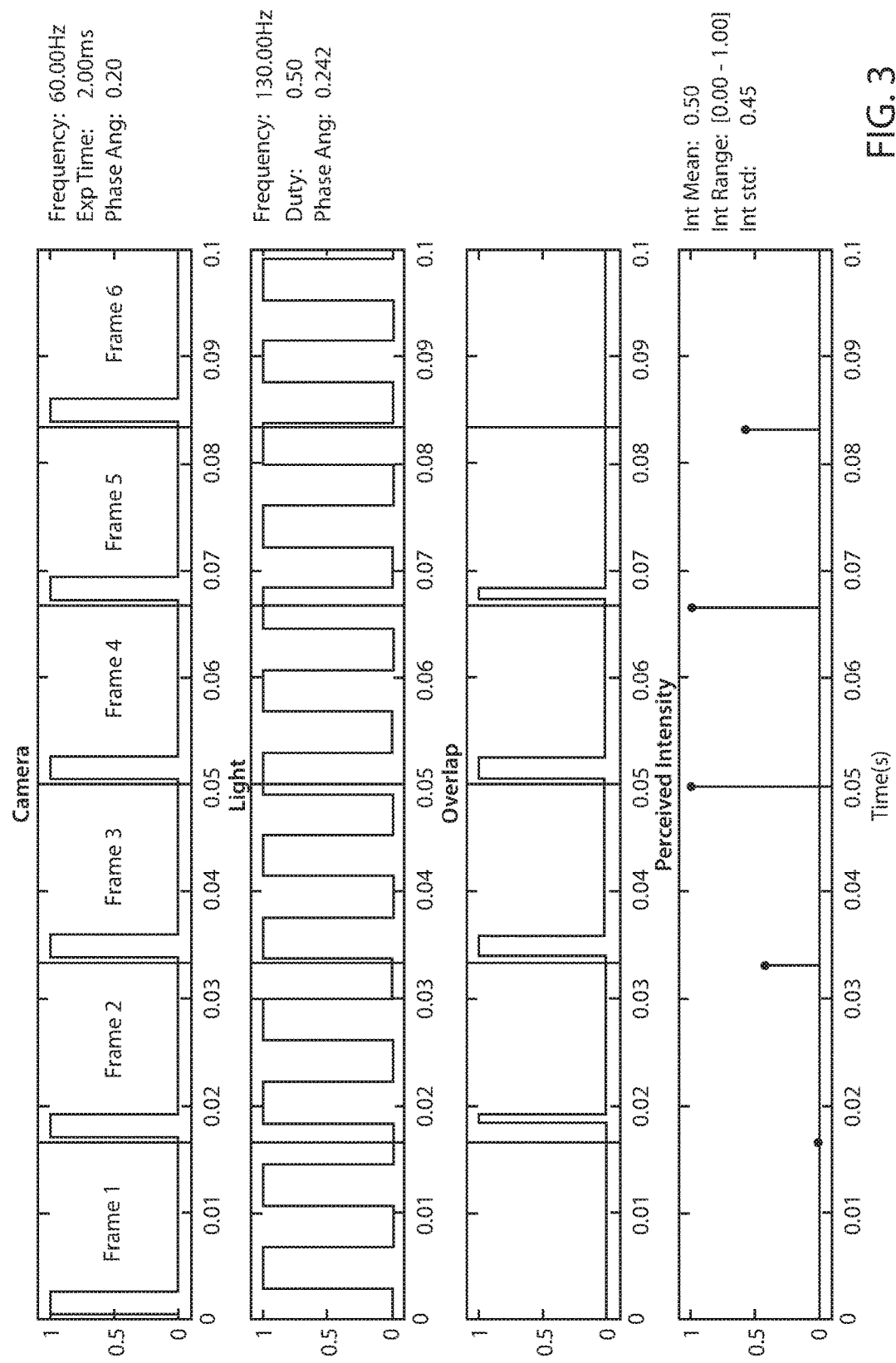
FIG. 3 is a series of timing diagrams showing a flickering effect caused by an amplitude-modulated light source when uncorrected.

FIG. 3 illustrates an example of the flicker effect an AM light source may have on perceived intensity of that AM light source when captured at an exposure time that does not match a multiple of the modulation frequency of the AM light source. In FIG. 3 four plots are shown with time being the common variable along the horizontal axis. The first plot (uppermost) shows the frame rate and exposure time of the camera where the pulses represent the exposure periods and the vertical lines delineate start and stop times of the labeled image frames (e.g. Frame 1, Frame 2, etc.). In this example, the period (also referred to herein as the frame rate or sampling rate) is 1/60.0 Hz with a corresponding frequency of 60 Hz, the exposure time is 2.00 ms, and the phase angle is 0.20.

The second plot of FIG. 3 shows the intensity of an AM light source. In this particular example, the AM light source modulation frequency is 130.00 Hz, the duty cycle is 50%, and the phase angle is 2.42.

The third plot of FIG. 3 demonstrates an overlap of the exposure times in the first plot and the intensity of the amplitude-modulated light source as shown in the second plot. For instance, in the first frame, the intensity of the AM light source is at zero during the exposure time and thus there is no overlap in the first frame. The lack of overlap between the first frame and the activation of the AM light source would falsely indicate that no light source is present. Accordingly, as shown in the fourth plot, the perceived intensity of the AM light source is zero in the first frame. In the second frame, some, but not all, of the first pulse of the AM light source is present during the exposure time (as shown, the AM light source is at a high intensity during half of the exposure time), and thus there is a perceived brightness of half the full value.

In the third frame, the AM light source is at a high level throughout the exposure period and thus, the perceived intensity is at full intensity. The fourth frame yields the same result as the third. The fifth frame yields the same result as the second frame, and the sixth frame yields the same result as the first frame. Over the six frames illustrated, the mean intensity is 50% of the full intensity, and the perceived intensity ranges from 0.00 to 1.00. The intensity standard deviation is 0.45. From the example shown in FIG. 3, the resulting variation in the perceived intensity of the AM light source results in an apparent change in light intensity over the consecutive image frames resulting in the flickering effect displayed on the display 32.

Figure 4:
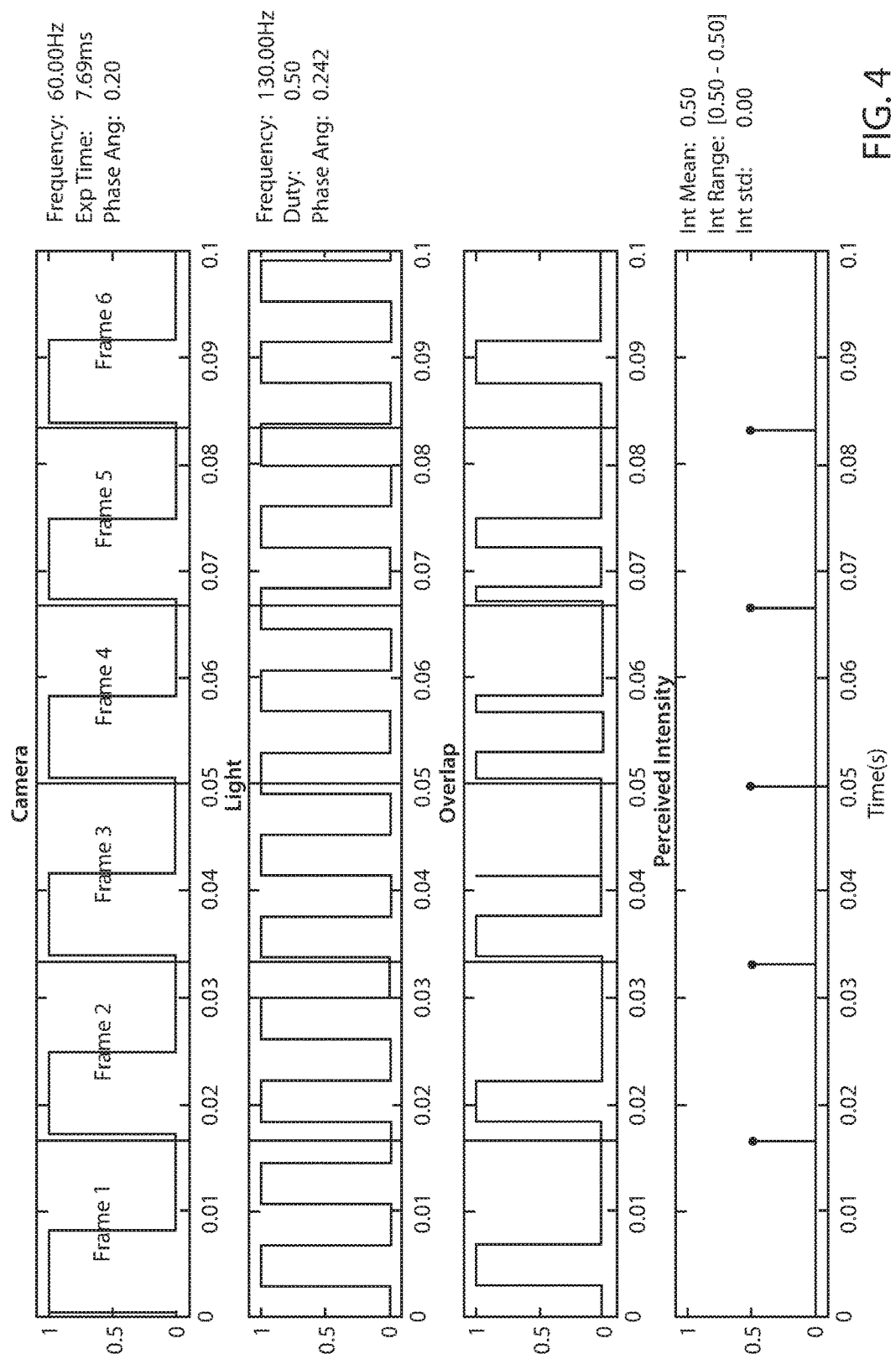
FIG. 4 is a series of timing diagrams showing a flickering effect caused by an amplitude-modulated light source corrected using the systems and methods disclosed herein.

FIG. 4 illustrates an example of the benefits of the present method on reducing perceived flicker of an AM light source when captured at an exposure time that matches a multiple of the modulation frequency of the AM light source. In FIG. 4, four plots are shown with time being the common variable along the horizontal axis. The first plot (uppermost) shows the frame rate and exposure time of the camera where the pulses represent the exposure periods and the vertical lines delineate start and stop times of the labeled image frames (e.g. Frame 1, Frame 2, etc.). In this example, the frequency is 60.0 Hz, the exposure time is 7.69 ms, and the phase angle is 0.20.

The second plot of FIG. 4 shows the intensity of an AM light source. In this particular example, the AM light source modulation frequency is 130.00 Hz, the duty cycle is 50%, and the phase angle is 2.42 (the same as the example in FIG. 3).

The third plot shows the overlap of the exposure times in the first plot and the intensity of the AM light source as shown in the second plot. Unlike the example of FIG. 3, the exposure time is lengthened to result in the same amount of overlap in each frame and thus the same perceived intensity of 0.50 for each frame. Over the six frames illustrated, the mean intensity is 50% of the full intensity, and the perceived intensity ranges from 0.50 to 0.50. The intensity standard deviation is 0.00. In the example shown in FIG. 4, the perceived intensity of the AM light source does not flicker and has the correct perceived intensity of 0.50.

Referring back to FIG. 2, multiple methods exist for detecting AM light sources (step 102). The methods may involve the detection of time-varying lights in a sequence of captured images. In the problem area of a rearview mirror replacement system (based on an electronic camera 26, an image processing unit 30, and a display system 32), the AM light sources commonly encountered may be PWM LED lights. Such lights may originate from vehicle headlamp and tail-lamp systems, which are encountered on the same roadways as the vehicle outfitted with the rearview mirror replacement system. Accordingly, a search space in the image data for the PWM LED lights of interest can be influenced by roadway detection.

A roadway detection identifying the search space may be identified by a number of methods. For example, a search space for the AM light sources may be identified via an auto-aim or lane detection system. In such systems, the image processing unit 30 may select a light search space within a field of view of the camera 26 to a vertical region above a detected road boundary identified by the lane detection system. Similarly, the image processing unit 30 may select or assign a search space in image data around a focus of expansion that may be associated with an auto aim system. By identifying the search space for the AM light sources, the image processing unit 30 may further discriminate vehicle light sources from stationary non-vehicle light sources. In the search space, a variety of methods may be applied to detect AM light sources (e.g. PWM LED lights) some of which are disclosed in commonly-owned U.S. Pat. Nos. 6,587,573; 6,593,698; 6,611,610; 6,631,316; 6,653,614; 6,728,393; 6,774,988; 6,861,809; 6,906,467; 6,947,577; 7,321,112; 7,417,221; 7,565,006; 7,567,291; 7,653,215; 7,683,326; 7,881,839; 8,045,760; 8,120,652; and 8,543,254, the entire disclosures of which are incorporated herein by reference.

Additionally, the image processing unit 30 may apply detection methods, such as frame subtraction, to detect time-varying light sources. Frame subtraction may comprise subtracting successive images from one another to produce temporal difference maps. The resultant maps may be processed by the image processing unit 30 as routines (implemented in software or in ASIC/FPGA fabric), which perform some combination of thresholding and/or filtering to identify spatial areas in the map where there were significant changes in pixel brightness between the two source images. The absolute value of the difference data indicates the magnitude of the change in pixel intensity between frames, and the sign of the difference data indicates whether the change in a pixel value between frames is associated with a light source brightening, or darkening. The frame data used to generate these temporal difference maps may be raw data from a Bayer patterned image, luminance data extracted from said image, or some other image form extracted from the image processing path. On a typical roadway scene, the most significant deltas in pixel values between a pair of frames (referenced to a single pixel location), tend to be related to these PWM LED (AM) lights which are going from extremely bright, to fully off. Motion artifacts can also contribute to temporal changes in image values at the pixel locations, but in the search space of the roadway imaged by the vehicle, this motion is quite small—as the image capture rate is rapid compared to vehicle dynamics, and the brightness changes related to objects which do not produce their own illumination is also substantially reduced. For example, imaging a vehicle body at a pixel in the first frame to a part of the vehicle bumper in the next frame does not produce as significant a luminance change as the PWM LED is exhibiting in its on/off sequencing.

Other methods of detecting the presence of AM lights may be leveraged from the imager implementation. For example, some imagers may supply information to the image processing unit 30 at the pixel level. Such information may include whether a scene brightness changed state during an exposure time of each pixel a pixel array. This information may be associated with imagers configured to improve a dynamic range of the image data during an exposure time. An example of such an imager is a complementary metal-oxide-semiconductor (CMOS) imager configured for high dynamic range (HDR) operation. Accordingly, the image processing unit 30 may utilize the exposure information for each pixel to identify whether a brightness change occurred in for each pixel in a pixel array.

With respect to steps 106 and 108, various methods may be used to adjust the exposure time of the camera 26 to match a multiple of a modulation frequency of the AM light sources such that one or more AM light sources do not appear to flicker in the streamed video images supplied to the display 32. One such method is illustrated in FIG. 5 and described below.

The modulation frequency of AM light sources that may appear in the scene proximate the vehicle may vary considerably and generally may not be known in advance. Although it is possible to sweep through all possible exposure times until the perceived flicker is no longer present, it may be advantageous to select exposure times in such a manner that allow an appropriate exposure time to be selected as quickly as possible. In this way, the image system 10 may minimize the flicker perceived by a viewer of the display 32 during the time that it takes to select an appropriate exposure time.

Figure 5:
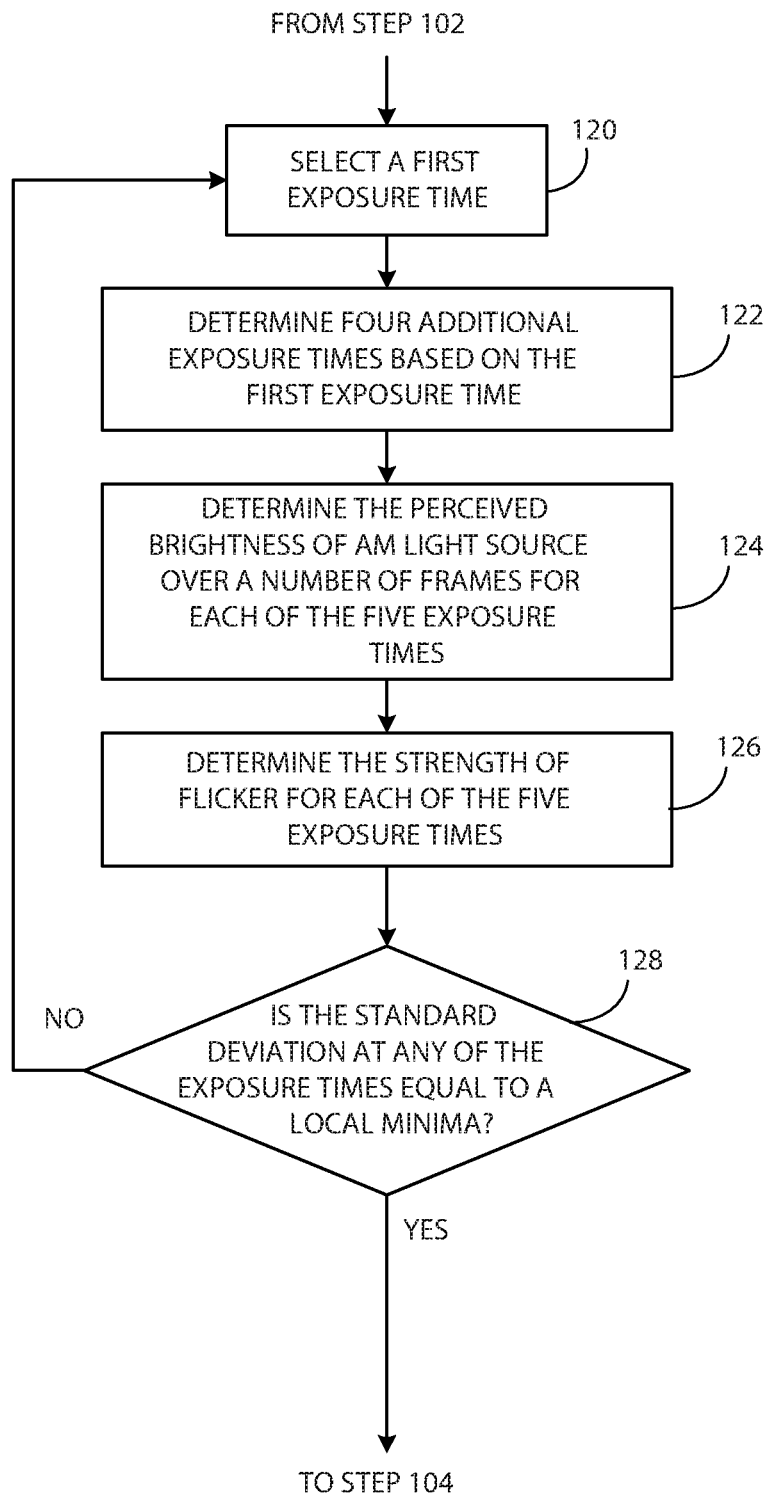
FIG. 5 is a flow chart showing a method for adjusting an exposure time of a camera configured to match a multiple of a modulation frequency of the amplitude-modulated light sources.

A first iterative approach is illustrated in FIG. 5. In this approach, the image processing unit 30 may set an initial set of five exposure times. The image processing unit may begin by selecting a first exposure time (step 120). Based on the first exposure time, the image processing unit 30 may further select four additional exposure times (step 122). The image processing unit 30 may then identify a perceived brightness of an AM light source over a number of frames (step 124) for each of the five exposure times. From the variance in the perceived brightness, image processing unit 30 may identify the strength of the flicker for each of the five exposure times (step 126).

Next, the variance of the perceived brightness may be calculated by the image processing unit 30 as the square of the standard deviation. The perceivable flicker is not present when the square of the standard deviation is minimized. However, any decrease in the standard deviation or variance of the perceivable flicker may be attributed to a reduction in the flicker intensity. In some embodiments, an iterative method may be applied to reduce the flicker intensity over successive selections of exposure times (e.g. a first plurality of exposure times, second plurality of exposure times, etc.) in order to minimize the standard deviation and the corresponding flicker intensity. Such a minimized condition of the square of the standard deviation may correspond to a local minima of measurements described herein. Thus, in step 128, it is determined whether the standard deviation is minimized.

Though five exposure times are described in reference to the exemplary embodiment discussed in reference to FIG. 5, the number of exposure times selected may vary. For example, the number of exposure times may correspond to two, three, four, five, six, seven, or various other numbers of exposure times. Accordingly, the exemplary embodiments discussed herein should not be considered limiting to claimed invention unless expressly stated otherwise.

The image processing unit 30 may set the first exposure time (of the initial set of five exposure times) in step 120 based on an exposure time selected using an auto-exposure control of the camera 26. For example, the image processing unit 30 may determine the auto-exposure based on a light level or average light level detected by the pixels of the imager of the camera 26. The auto-exposure time may be selected by the image processing unit 30 to minimize an over-exposure of one or more of the pixels of the imager such that meaningful image data may be gathered for most of the pixels. That is, the image processing unit 30 may select the first exposure time in step 120 based on the auto-exposure setting. In some embodiments, the auto-exposure setting may be selected by the image processing unit 30 to ensure that the pixels are not over-exposed (e.g. exposed for such a long time period such that a large number of pixels are saturated) or under-exposed (e.g. exposed for a short time period such that the pixels have not registered or detected light). In this way, the image processing unit 30 may control the camera 26 to capture the first exposure time based on the ambient lighting of a scene captured in the field of view of the imager of the camera 26.

In step 122, the image processing unit 30 may control the imager to capture the next two exposure times (e.g. the second exposure and the third exposure) at longer exposure times than the first exposure time. Additionally, the image processing unit 30 may control the imager to capture the last two exposure times (e.g. the fourth exposure and the fifth exposure) at shorter exposure times than the initial exposure time. The spacing of the exposure times may be fixed or a percentage of the average scene intensity. The separation of the five exposure times may be far enough away to account for any noise but not so large as to jump over the local minima (described below).

As noted above, intensity variance is the metric used to describe the intensity of the perceived flickering or flicker as discussed herein. However, intensity variation may be caused by noise or something other than flicker of an AM light source or something else in the scene. Accordingly, the image processing unit 30 may store a frame history identifying number of peaks in a number of previously captured frames. The image processing unit 30 may process the frame history with a high pass filter and generate high pass output data. The image processing unit 30 may then process the high pass output data determine a number of peaks in the frame history. Based on the number of peaks the image processing unit 30 may determine whether a rapid periodic oscillation between high and low values or random variance is present in the frame history. If the rapid periodic oscillation is present, the image processing unit 30 may determine that a flickering light source or AM light source is present in the image data.

Figure 6:
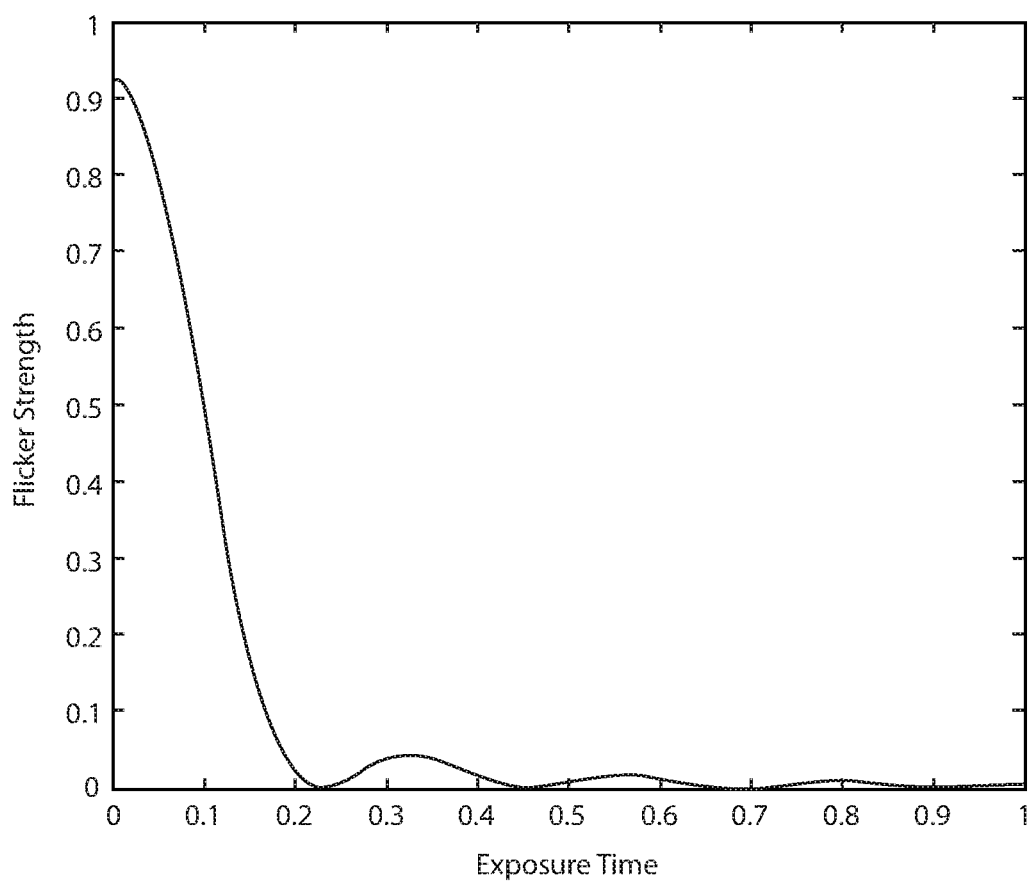
FIG. 6 is a plot showing flicker strength of an amplitude-modulated light source versus an exposure time of a system disclosed herein.

Conceptually, in some embodiments, the image processing unit 30 may be utilized to determine the exposure time based on an exposure time sweeping operation. Referring to FIG. 6, an example of such an operation is shown. In such embodiments, the image processing unit 30 may begin by assigning a minimum exposure time and sweep to a maximum exposure time. The image processing unit 30 may then plot a sampling function of the perceived brightness detected by the camera 26. In an exemplary embodiment, the sampling function may correspond to a sine cardinal function that is squared. Such a sampling function may be commonly referred to as a sinc squared function (e.g. $[\sin x/x]^2$) for the perceived brightness indicated in the image data. FIG. 6 demonstrates a plot of sinc squared function $[\sin x/x]^2$ as the flicker strength of the perceived brightness of the image data versus the exposure time. The exemplary plot has a number of local maximums and local minimums. Each local minimum corresponds to an exposure time that is a multiple of the modulation frequency of the AM light source.

When selecting the initial set of five exposure times in steps 120 and 122, the image processing unit 30 may not initially be informed of the corresponding flicker strengths in the sampling function (e.g. the sinc squared function $[\sin x/x]^2$). For example, the selected five exposure times may generally be located at a critical point of the sampling function or to the left or right of a critical point. That is, one of the selected five exposure times may be located at a local minimum, a local maximum, or to the left or right side of these critical points. In order to determine where along the sampling function the selected five exposure times lie, the image processing unit 30 may compare the values of each of the selected five exposure times in relation to one another. If three adjacent times of the selected five exposure times demonstrate a valley, an approximate local minimum may be identified. For example, the three adjacent times of the selected five exposure times include exposure times located left, middle, and right relative to one another along the sampling function. Accordingly, if the middle exposure time has a lower magnitude than the left and right magnitudes, the image processing unit 30 may identify that the middle exposure time corresponds approximately to a local minimum of the sampling function.

As described herein the approximate local minimum may refer to a point that is close to, but may not exactly fall on a critical point or local minimum. The approximate nature of the approximate local minimum may account for an error between the exact value of the local minimum that relates directly to the step size or difference in exposure times among the plurality of selected exposure times (e.g. the selected five exposure times). In operation, when applying the iterative approaches discussed herein, the image processing unit 30 may select the difference or delta among the selected exposure times based on an expected frequency and corresponding distance among the critical points of the sampling function. For example, the image processing unit 30 may be configured to search for AM light sources with frequencies ranging from approximately 60 Hz to 600 Hz. For this range of frequencies, the difference among the plurality of selected exposure times may be calculated to limit the likelihood that a critical points or inflection points of the sampling function are skipped or missed due to the difference exceeding a portion of a wavelength (e.g. a half wavelength) of the sampling function.

Accordingly, upon identifying a middle exposure time with a lower magnitude than the adjacent left and right magnitudes, the image processing unit 30 may identify that the middle exposure time corresponds to an approximate local minimum of the sampling function. In this way, the image processing unit 30 may identify the approximate local minimum without requiring extra processing time to exactly identify the mathematical critical point of the sampling function. To further ensure that the approximate local minimum is not falsely identified due to a step size exceeding a partial wavelength of the sampling function, the image processing unit 30 may further calculate the standard deviation of the flicker strength to ensure that the flicker strength is minimized or below a predetermined threshold (e.g. approximately zero). In this way, the image processing unit 30 may identify the approximate local minimum of the sampling function with a high level of certainty and set the camera exposure to the approximate local minimum to ensure that the apparent flicker is minimized when the streaming images are displayed on the display 32. Accordingly, the approximate local minimum may provide for significant reduction in the flicker intensity to ensure that the flicker of the AM light source is effectively eliminated from the display 32.

Thus, when taking measurements over a number of frames for the five exposure times in step 124, the flicker strength may be determined from the measurements by the image processing unit 30. Then, based on the flicker strength, the image processing unit 30 may determine where in the sampling function ($[\sin x/x]^2$) the measurements are located and determine from each measurement whether flicker strength is increasing, decreasing or at a local minimum.

If the image processing unit 30 does not identify a local minimum in the initial five exposure times, the image processing unit 30 may select an additional five exposure times based upon the measurements obtained for the previous set of five exposure times. For example, if the image processing unit 30 identifies that the flicker strength decreases for the two exposure times that are longer than the initial exposure time, the image processing unit 30 may assign the next five exposure times to be longer than the previous five. On the other hand, if the image processing unit 30 identifies that one of the middle exposure times of the set of five has the lowest flicker strength, the image processing unit 30 may select the next set of five exposure times near the exposure time with the lowest flicker strength while the spacing between the exposure times is reduced to narrow in on the local minimum. In this way, the image processing unit 30 may further improve or verify that the middle exposure time of the plurality of exposure times accurately identifies the approximate local minimum.

In operation, the image processing unit 30 may continue this observation and adjustment process of the exposure time until the image processing unit 30 identifies an approximate local minimum based on the sampling function ($[\sin x/x]^2$) (and the standard deviation is approximately zero). The higher the modulation frequency of the AM light source, the closer the minima. Thus, the image processing unit 30 may be configured to have maximum spacing or step size among the plurality of exposure times targeting a detection of a maximum frequency of the AM light source. In this way, the image processing unit 30 may be configured to both accurately and efficiently detect the local minima of the sampling function.

Figure 7:
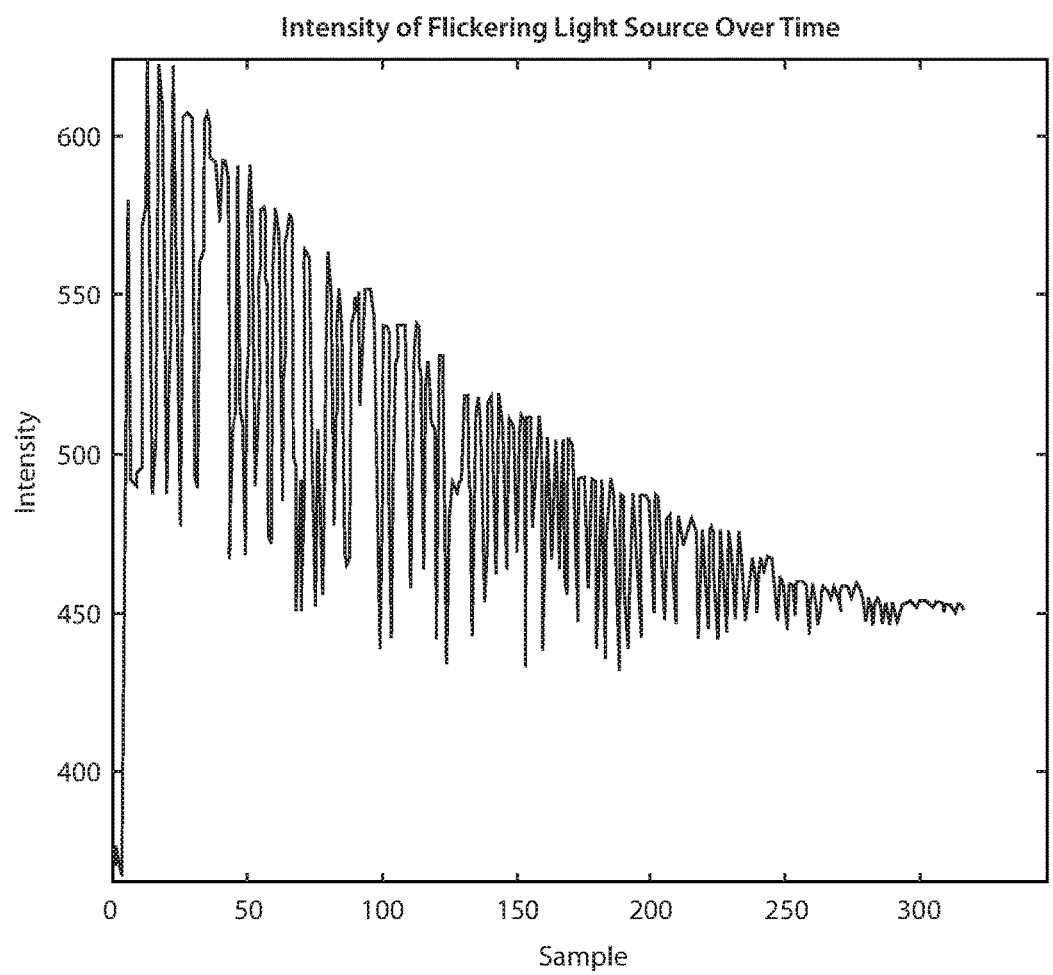
FIG. 7 is a plot showing an intensity of an amplitude-modulated light over time as corrected using the iterative method of FIG. 5.

FIG. 7 shows an example of the intensity of a flickering light source over time as the exposure time is adjusted to find the approximate local minimum. As indicated in FIG. 7, the image processing unit 30 may decrease the intensity of the flickering light source over time by setting the initial exposure as demonstrated in the first sample and incrementally improving the selection of the exposure time based on the methods described herein. For example, the iterative method discussed in reference FIG. 5 was applied to a periodic light source captured by an exemplary camera similar to that utilized for the image system 10 to generate the sample data used to plot FIG. 7. Accordingly, the methods provided herein may be utilized to significantly limit the variation in the intensity of one of more AC light sources captured by the imager of the camera 26.

Figure 8:
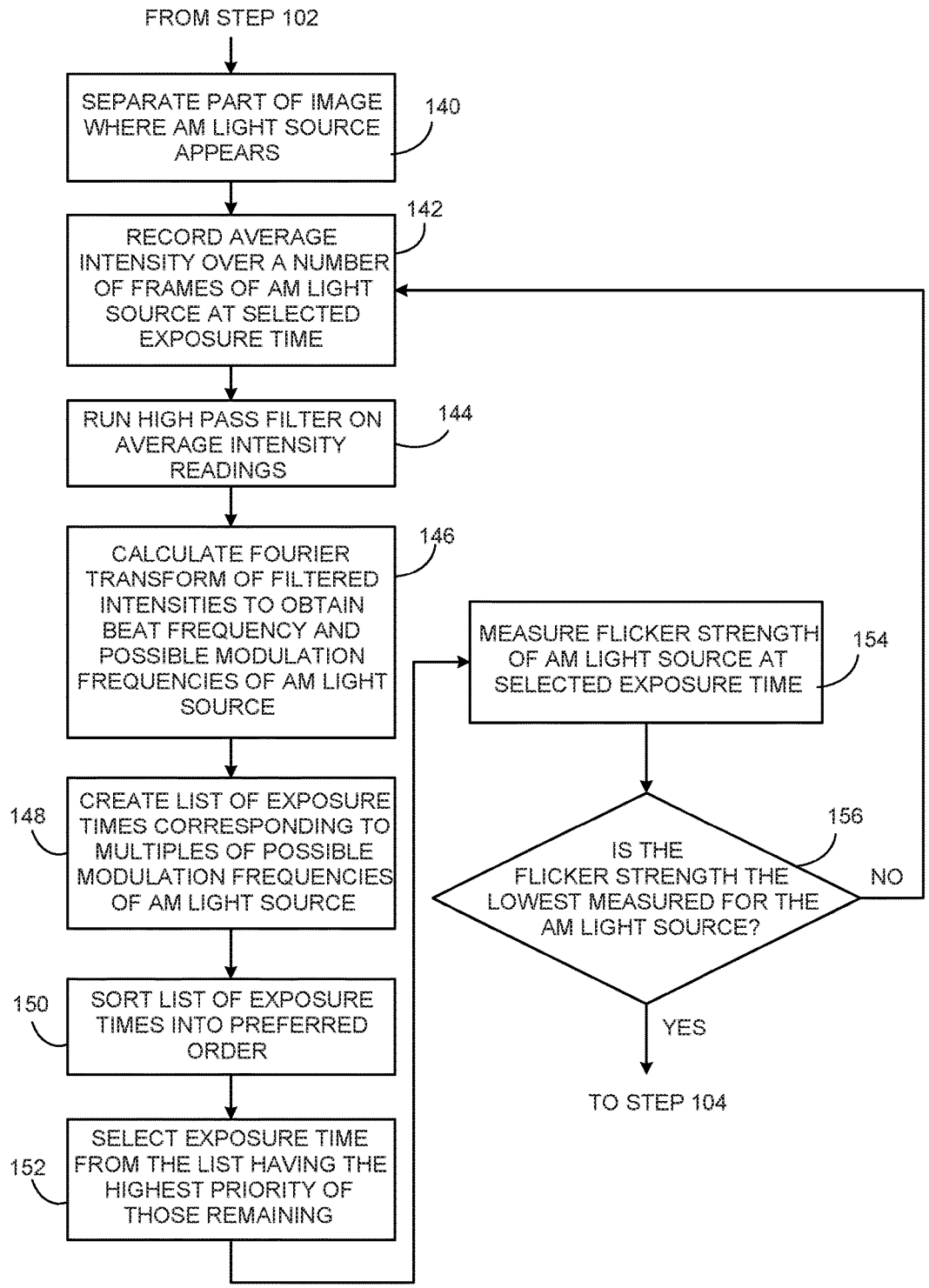
FIG. 8 is a flow chart demonstrating a method for adjusting an exposure time of a camera to match a multiple of a modulation frequency of an amplitude-modulated light source.

FIG. 8 illustrates another method for performing steps 106 and 108. In this method, the image processing unit 30 may separate a portion of the image in which the flickering AM light source appears from the rest of the image (step 140). Next, the image processing unit 30 may monitor the intensity of the AM light source over a predetermined number of frames and determine the average intensity over the predetermined number of frames (step 142). Next, the image processing unit 30 may apply a high pass filter over the average intensity recordings normalizing the intensity recordings and removing any long term low frequency variations (step 144).

The image processing unit 30 may then apply a transform, for example a Fourier transform or other suitable mathematical analysis methods, on the output of the filter (step 146). For example, the output of a Fourier transform may provide an output signal having a frequency between 0 Hz and approximately half the imager's sampling rate or frequency. The value of the output signal may identify a beat frequency. The beat frequency represents the difference between a multiple of the sample rate of the camera and the modulation frequency of the AM light source. For example, if the image processing unit 30 identifies a strong spike at 10 Hz from the Fourier transform, the image processing unit 30 may identify that the AM light source is 10 Hz off of a multiple or harmonic frequency of a current sample rate of the camera 26. For example if the sample rate of the camera is 60 Hz, the modulation frequency of the AM light source may be as follows: 50 Hz or 70 Hz for the base frequency of 60 Hz, 110 Hz or 130 Hz for the first harmonic frequency of 120 Hz, 170 Hz or 190 Hz for the second harmonic frequency of 180 Hz, etc. These values correspond to the critical values of the sampling function ($[\sin x/x]^2$) shown in FIG. 6. The closer the flicker rate is to a multiple of the sampling rate of the camera 26, the lower the beat frequency, and the slower but more severe the flicker appears to be.

The above steps 142-146 thus provide a set of possible modulation frequencies of the flickering AM light source. By selecting exposure times corresponding to multiples of these possible modulation frequencies, the image processing unit 30 may generate a list of exposure times (step 148). The image processing unit 30 may the sort the list of exposure times into a preferred order based on scene brightness (step 150). Then the image processing unit 30 may select an exposure from the list (step 152) and the flicker strength may be measured at selected exposure time (step 154). The image processing unit 30 may repeat steps 142 and 154 iteratively until the image processing unit 30 identifies an acceptable flicker strength is obtained (step 156). The acceptable flicker strength may be less than a predetermined flicker strength. Finally, once the exposure time and frame rate are determined by the image processing unit 30, the image processing unit 30 may control the camera 26 to utilize the associated exposure time as long as the AM light source is present in the image data.

The methods described above with respect to FIGS. 5 and 8, may be applied by the image processing unit 30 in tandem. Specifically, if the beat frequency can be determined, then the possible modulation frequencies may initially be used by the image processing unit 30 in the method of FIG. 5 to effectively narrow the search space.

In the event that the overall brightness of the imaged scene is below a threshold value, the image processing unit 30 may maximize the exposure time of the camera 26, which may reduce flicker as apparent from the sampling function ($[\sin x/x]^2$) shown in FIG. 6. If the brightness of the imaged scene is not below the threshold value, the maximum exposure time may not be applied by the image processing unit 30 so as to not over-expose or saturate the image data.

Figure 9:
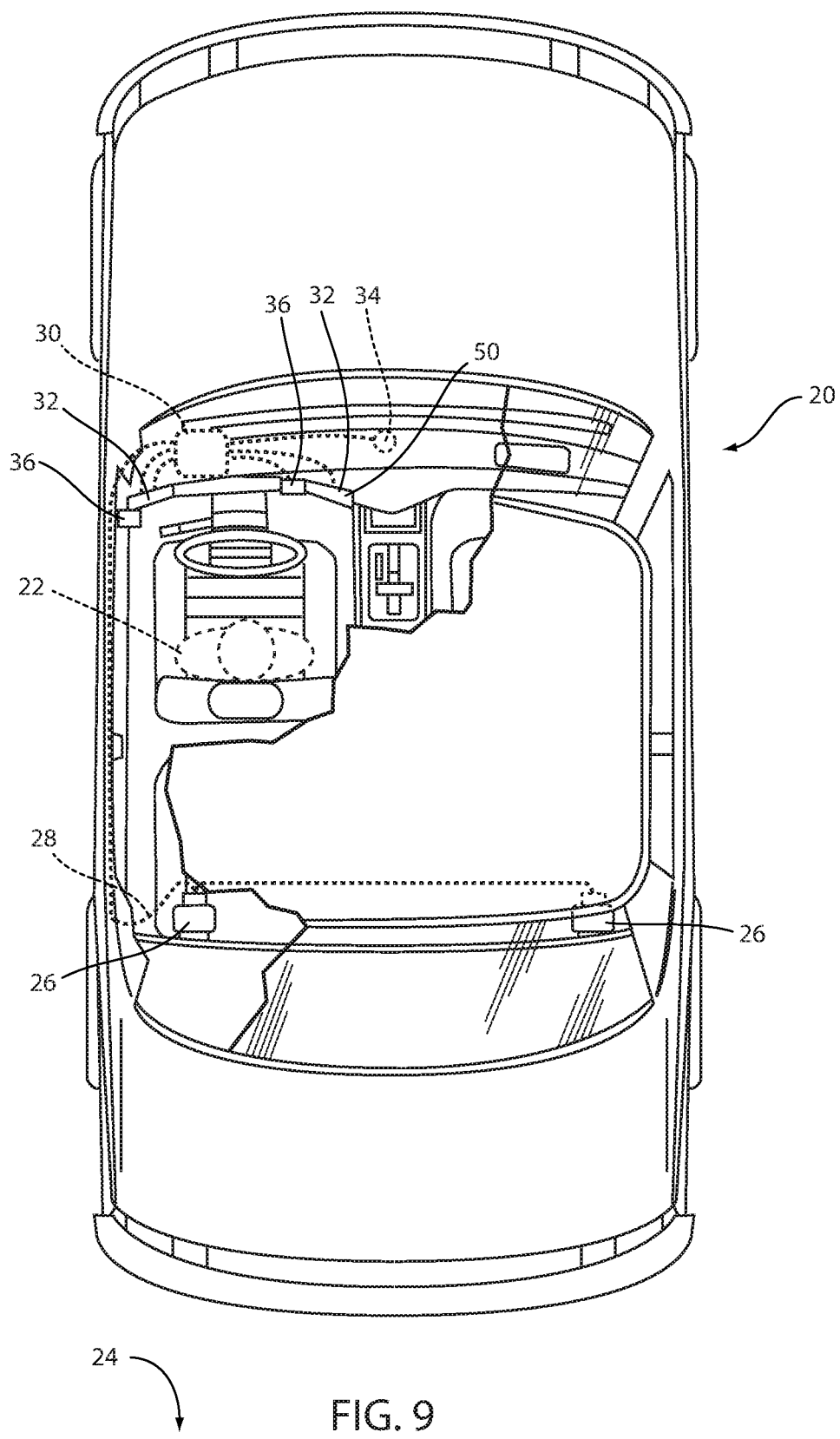
FIG. 9 is a cut-away plan view of a vehicle comprising an image system in accordance with the disclosure.

Referring now to FIG. 9, a schematic diagram of a vehicular implementation of the above embodiment is shown. A vehicle 20 is shown that is driven by an operator 22. One or more cameras 26 are operative to view a scene 24 proximate the vehicle 20. In the example shown, the scene 24 is generally behind vehicle 20. Of course, however, camera 26 may be oriented in a variety of ways to view scenes at other locations proximate the vehicle 20 including, but not limited to, the sides, back, front, bottom, top, and inside. In the example shown, signals representative of the scene 24 are sent via channel 28 to an image processing unit 30. Image processing unit 30 produces an enhanced image of scene 24 on one or more displays 32. Input from an optional ambient light sensor 34 and one or more direct glare sensors 36 are also available to image processing unit 30. Such inputs may be utilized to assist in identifying an initial exposure setting for the camera 26.

In some embodiments, a rearview assembly 50 (FIGS. 10A and 10B) of the vehicle 20 may be augmented or replaced by the image system 10 having cameras 26. The cameras 26 may have extended or wide fields of view extending to the back and sides of the vehicle 20 so that pedestrians or other objects directly in back of vehicle 20 may be seen and so that oncoming traffic from the sides may be seen. The system 10 is designed so that, when backing out of a parking spot, oncoming vehicles may be seen before backing into a lane of travel. Such performance may require the camera 26 to have a near 180° field of view or several cameras 26 mounted near the rear of the vehicle. An analogous system with a camera or cameras 26 mounted near the front of the vehicle 20 may further be adapted to view cross traffic at a "blind" intersection before entering the lane of travel of the cross traffic. These are desirable applications for the present invention which supplement the viewing function of conventional rearview mirrors.

Figure 10B:
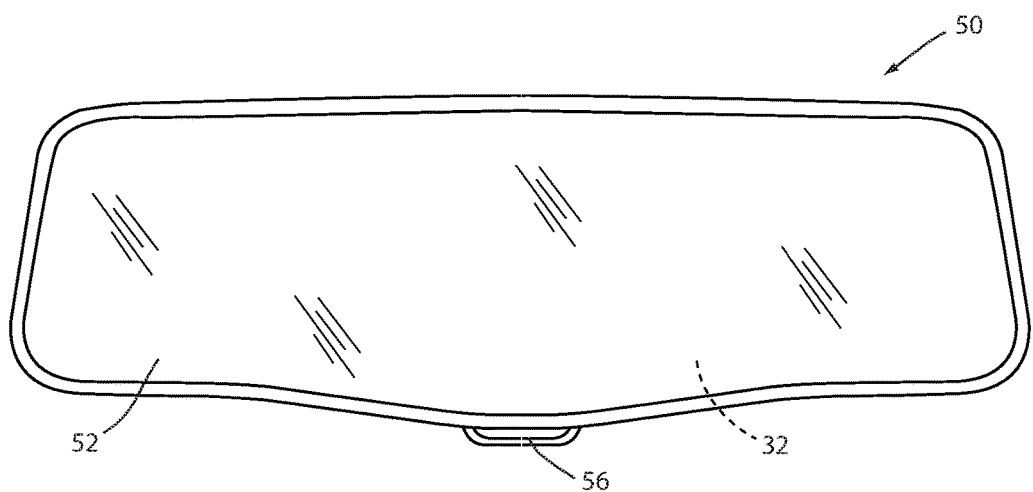
FIG. 10B is a front elevational view of the rearview assembly shown in FIG. 10A.

FIGS. 10A and 10B demonstrate an example of a rearview assembly 50 having a housing 54 with the display 32. As demonstrated the rearview assembly 50 may further comprise an optional mirror element 52 positioned in front of the display 32. A user switch 56 may be provided for tilting of the mirror element 52 and/or the display 32 to reduce glare on the display 32 when activated. Examples of such a rearview assembly 50 are disclosed in commonly-owned U.S. Pat. No. 9,511,715 and U.S. Patent Application Publication Nos. 2015/0266427 A1 and 2015/0277203 A1, now U.S. Pat. No. 9,834,146, the entire disclosures of which are incorporated herein by reference. The optional ambient light sensor 34 and a direct glare sensor 36 may additionally be incorporated in rearview assembly 50. Further, the image processing unit 30 may be disposed in the rearview assembly 50. The rearview assembly 50 may be an interior rearview assembly as shown in FIGS. 10A and 10B, or may be an exterior rearview assembly.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An image capture system for a vehicle equipped with a display for displaying streamed video images of a scene proximate the vehicle, the image capture system comprising:
   a camera comprising a field of view for capturing video images of the scene proximate the vehicle and streaming the video images; and
   an image processing unit for receiving the streamed video images, processing the streamed video images and supplying the streamed video images to the display,
   wherein the image processing unit is configured to:
      select a first plurality of exposure times comprising a first exposure time and at least a second exposure time;
      select the first exposure time based on ambient light conditions in the field of view;
      adjust the first exposure time to the second exposure time based on an amplitude-modulated light source in the streamed video images;
      calculate a variance of a flicker intensity for the amplitude-modulated light source for each of the first plurality of exposure times; and
      display the amplitude-modulated light source in the streamed video images supplied to the display with a reduced flicker intensity of the amplitude-modulated light sources.

2. The image capture system according to claim 1, wherein the processing unit is further configured to:
   detect a modulation frequency of the amplitude modulated light source.

3. The image capture system according to claim 2, wherein the second exposure time is approximately a multiple of a modulation frequency of the amplitude-modulated light sources.

4. The image capture system according to claim 1, wherein the processing unit is further configured to:
   select the first plurality of exposure times based on the first exposure time, wherein the first plurality of exposure times comprises the second exposure time longer than the first exposure time and a third exposure time shorter than the first exposure time.

5. The image capture system according to claim 1, wherein the processing unit is further configured to:
   capture the first plurality of exposure times comprising a fourth exposure time and a fifth exposure time selected based on the first exposure time.

6. The image capture system according to claim 1, wherein the processing unit is further configured to:
   based on the variance of the flicker intensity of each of the first plurality of exposure times, determine whether the flicker intensity of each of the first plurality of exposure times is increasing, decreasing, or at an approximate local minimum.

7. The image capture system according to claim 6, wherein the processing unit is further configured to:

in response to the first plurality of exposure times failing to comprise an exposure time at the approximate local minimum, selecting a second plurality of exposure times based on a most improved exposure time of the first plurality of exposure times, wherein the most improved exposure time comprises the greatest decrease in the flicker intensity.

8. An image system for a vehicle, the image system comprising:

a camera for capturing video images of a scene proximate the vehicle at a selected exposure time and streaming the video images;

an image processing unit for receiving the streamed video images and processing the streamed video images; and a display for displaying the streamed video images;

wherein the image processing unit is configured to:
detect an amplitude-modulated light source in the streamed video images;
adjust the exposure time of the camera to match the multiple of the modulation frequency by selecting a first exposure time and selecting a first plurality of exposure times based on the first exposure time;
determine a flicker strength of each of the first plurality of exposure times over a plurality of the video images;
determine a magnitude of a sampling function of the flicker strength of each of the first plurality of exposure times;
compare the magnitude of each of the first plurality of exposure times to determine if one of the plurality of exposure times is an approximate local minimum; and
adjust the exposure time of the camera to match a multiple of a modulation frequency of the amplitude-modulated light sources decreasing a flicker intensity of the amplitude-modulated light sources in the streamed video images supplied to the display.

9. The image system according to claim 8, wherein the image processing unit is further configured to adjust the exposure time of the camera to match the multiple of the modulation frequency by:

determining a beat frequency of the amplitude-modulated light sources; and adjusting the exposure time of the camera based on the beat frequency.

10. The image system according to claim 8, wherein the image processing unit is further configured to:

in response to identifying an approximate local minimum, set the exposure time to the one of the first plurality of exposure times; and in response to failing to identify the approximate minimum, selecting a second plurality of exposure times.

11. The image system according to claim 8, wherein the image processing unit is further configured to:

(a) adjust the exposure time of the camera to match the multiple of the modulation frequency by selecting a first exposure time;

(b) select a plurality of exposure times based on the first exposure time;

(c) determine a perceived brightness of the amplitude-modulated light source over a number of frames for each of the plurality of exposure times comprising the first exposure time and a plurality of additional exposure times;

(d) calculate a sampling function for each of the plurality of exposure times from the perceived brightness of the amplitude-modulated light source;

(e) determine whether a magnitude of the sampling function of each of the plurality of exposure times is at an approximate local minimum;

(f) in response to identifying a selected exposure time of the plurality of exposure times provides for the approximate local minimum, assign an exposure time of the camera to the selected exposure time; and (g) in response to failing to identify one of the plurality of exposure times to be the approximate local minimum, repeat steps (a)-(g) with different exposure times until approximate local minima is identified.

12. A method of capturing video images streamed from a camera within a vehicle, the method comprising:

detecting amplitude-modulated light sources in the streamed video images;

iteratively selecting a plurality of exposure times;

calculating a sampling function of a flicker strength of each of the plurality of exposure times over a plurality of the video images;

comparing a magnitude of the sampling function for each of the plurality of exposure times to identify an approximate minimum of the sampling function; and adjusting an exposure time of the camera to match a multiple of a modulation frequency of the amplitude-modulated light sources decreasing a flicker intensity of the amplitude-modulated light sources in the streamed video images when displayed.

13. The method according to claim 12, further comprising:

repeating the selecting of the plurality of exposure times until one of the plurality of exposure times yields the approximate minimum.

14. The method according to claim 13, wherein each iterative selection of the plurality of exposure times is based on a lowest standard deviation exposure time identified from a previous iteration of the plurality of exposure times.

15. The method according to claim 12, wherein, in order to adjust the exposure time of the camera to match a multiple of a modulation frequency of the amplitude-modulated light sources, the method further comprises:

determining a beat frequency of the amplitude-modulated light sources; and adjusting the exposure time of the camera based on the beat frequency.

16. The method of claim 12, wherein, in order to adjust the exposure time of the camera to match a multiple of a modulation frequency of an amplitude-modulated light source, the method further comprises:

(a) selecting an exposure time;

(b) selecting a plurality of exposure times based on the first exposure time;

(c) determining a perceived brightness of the amplitude-modulated light source over a number of frames for each of a plurality of exposure times;

(d) calculating a sampling function for each of the plurality of exposure times from the perceived brightness of the amplitude-modulated light source;

(e) determining whether a magnitude of the sampling function of each of the plurality of exposure times is increasing, decreasing, or at an approximate local minimum;

(f) in response to identifying a selected exposure time of the plurality of exposure times provides for the approximate local minimum, assigning the exposure time of the camera to the selected exposure time; and (g) in response to failing to identify one of the plurality of exposure times to be the approximate local minimum, repeating steps (a)-(g) with different exposure times until approximate local minima is identified.

* * * * *